United States Patent
Yang et al.

(10) Patent No.: US 10,431,811 B1
(45) Date of Patent: Oct. 1, 2019

(54) ELECTRIC VEHICLE BATTERY CELL HAVING WATER-BASED LI-ION ANODE SLURRY AND PROCESS OF PREPARING SAME

(71) Applicant: SF Motors, Inc., Santa Clara, CA (US)

(72) Inventors: Gang Yang, Santa Clara, CA (US); Ying Liu, Santa Clara, CA (US); Yifan Tang, Santa Clara, CA (US)

(73) Assignee: SF MOTORS, INC., Santa Clara, CA (US)

( * ) Notice: Subject to any disclaimer, the term of this patent is extended or adjusted under 35 U.S.C. 154(b) by 0 days.

(21) Appl. No.: 16/236,896

(22) Filed: Dec. 31, 2018

(51) Int. Cl.
| | |
|---|---|
| *H01M 4/02* | (2006.01) |
| *H01M 4/62* | (2006.01) |
| *H01M 4/04* | (2006.01) |
| *H01M 4/1393* | (2010.01) |
| *H01M 10/0525* | (2010.01) |
| *H01M 4/587* | (2010.01) |
| *H01M 4/133* | (2010.01) |

(52) U.S. Cl.
CPC ....... *H01M 4/1393* (2013.01); *H01M 4/0404* (2013.01); *H01M 4/0471* (2013.01); *H01M 4/133* (2013.01); *H01M 4/587* (2013.01); *H01M 4/625* (2013.01); *H01M 10/0525* (2013.01); *H01M 2004/027* (2013.01); *H01M 2220/20* (2013.01)

(58) Field of Classification Search
CPC .. H01M 4/1393; H01M 4/625; H01M 4/0471; H01M 4/0404; H01M 4/133; H01M 4/587; H01M 10/0525; H01M 2004/027; H01M 2220/20
See application file for complete search history.

(56) References Cited

U.S. PATENT DOCUMENTS

| | | | |
|---|---|---|---|
| 2007/0275302 A1* | 11/2007 | Sotowa | H01M 4/0433 429/217 |
| 2012/0081838 A1* | 4/2012 | Costantino | H01B 1/04 361/502 |
| 2012/0237825 A1* | 9/2012 | Nakano | H01M 4/0404 429/211 |

(Continued)

OTHER PUBLICATIONS https://www.researchgate.net/post/What_is_the_procedure_to_prepare_a_3_aqueous_solution_of_carbomethoxycellulose (Year: 2015).*

*Primary Examiner* — Lisa S Park
(74) *Attorney, Agent, or Firm* — Foley & Lardner LLP; James De Vellis

(57) ABSTRACT

Described is a method to form an anode for a battery pack to power an electric vehicle. The method can include forming a powder mix of a carbonaceous material and a conductive additive. The powder mix can be divided into portions and iteratively added to a carboxymethyl cellulose solution to generate a slurry. The slurry can be dispensed onto a face of a conductive film. Also described is a battery cell for a battery pack to power an electric vehicle. The battery cell can have a housing and at least one anode coupled with the housing. Each anode can have a conductive film forming the anode surface. Each anode can have a coating disposed on the conductive film. The coating can have an area loading of between 12 mg/cm² and 18 mg/cm² and can be between 95% and 99% by weight of a carbonaceous material and a conductive additive.

19 Claims, 8 Drawing Sheets

(56) References Cited

U.S. PATENT DOCUMENTS

| | | | |
|---|---|---|---|
| 2013/0071741 A1* | 3/2013 | Ohara | H01M 4/62 429/212 |
| 2013/0337319 A1* | 12/2013 | Doherty | H01M 4/0411 429/209 |
| 2014/0141355 A1* | 5/2014 | Huang | H01M 4/0402 429/482 |
| 2016/0344030 A1* | 11/2016 | Sakshaug | H01M 4/133 |

* cited by examiner

ELECTRIC VEHICLE BATTERY CELL HAVING WATER-BASED LI-ION ANODE SLURRY AND PROCESS OF PREPARING SAME

BACKGROUND

Batteries can include electrochemical materials to supply electrical power to electrical components connected thereto. Such batteries can provide electrical energy to electrical systems.

SUMMARY

Systems and methods described herein relate to a battery cell of a battery pack of an electric vehicle. The battery cell can include lithium ion (Li-ion) batteries having a plurality of high loading electrodes, such as cathodes or anodes. For example, anodes can be formed having a predetermined thickness and using a high active material percentage to improve the energy density of the respective Li-ion batteries.

At least one aspect of the disclosure is directed to a method of forming an anode for a battery pack to power an electric vehicle can include forming a powder mix comprising a carbonaceous material and a conductive additive. The method can include dividing the powder mix into a plurality of portions and generating a slurry by iteratively adding the portions to a solution. The method can include adding the powder portions iteratively to a carboxymethyl cellulose (CMC) solution. The method can further include mixing powder with the CMC solution. The method can further include dispensing the slurry onto a face of a conductive film.

At least one aspect of the disclosure is directed to a battery cell for a battery pack to power an electric vehicle. The battery cell can include a housing. The battery cell can have at least one anode coupled with the housing. Each anode can have a conductive film that can have a first face and a second face. Each anode can have a coating disposed on the first face and the second face. In one or more embodiments, the coating can be an area loading of between 12 mg/cm$^2$ and 18 mg/cm$^2$. The coating can be between 95% and 99% by weight of a carbonaceous material and a conductive additive.

At least one aspect of the disclosure is directed to an electric vehicle that includes a battery with an anode. The anode can be generated by forming an anode slurry. The anode slurry can be deposited onto a face of a foil to a thickness of between 100 µm and 300 µm. The anode slurry and foil can be heated, during a first phase, at between 55° C. and 65° C. for between 3 minutes and 9 minutes. The anode slurry and the foil can be heated, during a second phase, at between 75° C. and 85° C. for between 2 minutes and 6 minutes. An anode can be formed from at least a portion of the anode slurry on the face of the foil. The anode can be inserted into a battery housing of an electric vehicle battery.

At least one aspect of the disclosure is directed to a battery cell for a battery pack to power an electric vehicle. The battery cell can include a housing. The battery cell can include at least one anode that is disposed within the housing. Each of the at least one anodes can be formed by depositing an anode slurry on a face of a foil to a thickness of between 100 µm and 300 µm; heating, during a first phase, the anode slurry on the face of the foil at between 55° C. and 65° C. for between 3 minutes and 9 minutes; and heating, during a second phase, the anode slurry on the face of the foil at between 75° C. and 85° C. for between 2 minutes and 6 minutes.

At least one aspect is directed to a method of providing a battery cell of a battery pack to power an electric vehicle. The method can include providing a battery pack having a battery cell. The battery cell can include a housing that include a first end and a second end and defines an inner region. The method can include forming a coating for a plurality of anodes. The coating can be formed from a powder mix that can include a carbonaceous material and a conductive additive. The powder mix can be divided into a plurality of portions and added to solution to form the coating. The coating can be baked in a plurality of phases. The method can include disposing the plurality of cathodes into the inner region of the housing.

At least one aspect is directed to an electric vehicle. The electric vehicle can include a battery cell of a battery pack of an electric vehicle. The battery cell can include a housing defining an inner region and a plurality of cathodes that extend into the inner region. Each of the plurality of cathodes can include an aluminum material having a first face and a second face. A coating can be disposed on the first face and the second face. The coating can include lithium nickel cobalt aluminum oxide particles and a linear carbon conductive additive to form a connection between a plurality of the lithium nickel cobalt aluminum oxide particles.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Following below are more detailed descriptions of various concepts related to, and implementations of, battery cells for battery packs in electric vehicles. The various concepts introduced above and discussed in greater detail below can be implemented in any of numerous ways.

Systems and methods described herein relate to a battery cell of a battery pack of an electric vehicle having a plurality of anodes disposed in an inner region of the battery cell. The anodes can be manufactured from a lithium-ion anode slurry. The anode slurry can be configured for high areal loading, high active material percentage, and high density electrode coatings. Additionally, the systems and methods described herein can enable the mixing of the active materials, the conductive additives, the binders, and de-ionized (DI) water in a sequence that can reduce agglomerations in the anode slurry. The anode slurry can also bind better to a conductive film to reduce delamination. The process can also reduce the number of bubbles that form in the anode slurry and reduce the number of holes that form in the anode slurry. Additionally, the process can reduce the cracking of the baked anode slurry when the anode slurry and film and bent.

The systems and methods described herein can provide better electrical characteristics for an anode by providing an anode slurry that has high areal loading, high active material percentage, and high density electrode coatings. Each of the anodes can be formed by forming a powder mix that can include a carbonaceous material and a conductive additive. The powder mix can be divided into portions. Each of the powder portions can be added to an aqueous CMC solution in batches. After each powder portion is added, the solution can be mixed to incorporate the powder mix into the CMC solution before adding a next portion of the powder portion. Binder can be added to the CMC solution and powder mix and then further mixed. For example, about 3% of the binder can be added and the solution further mixed. The slurry can be deposited on a conductive film. The slurry can be dried and calendered. An anode can be formed out of the slurry coated conductive film. the anodes can be deposited into an electric vehicle battery. The battery can be provided for use in an electric vehicle.

Figure 1:
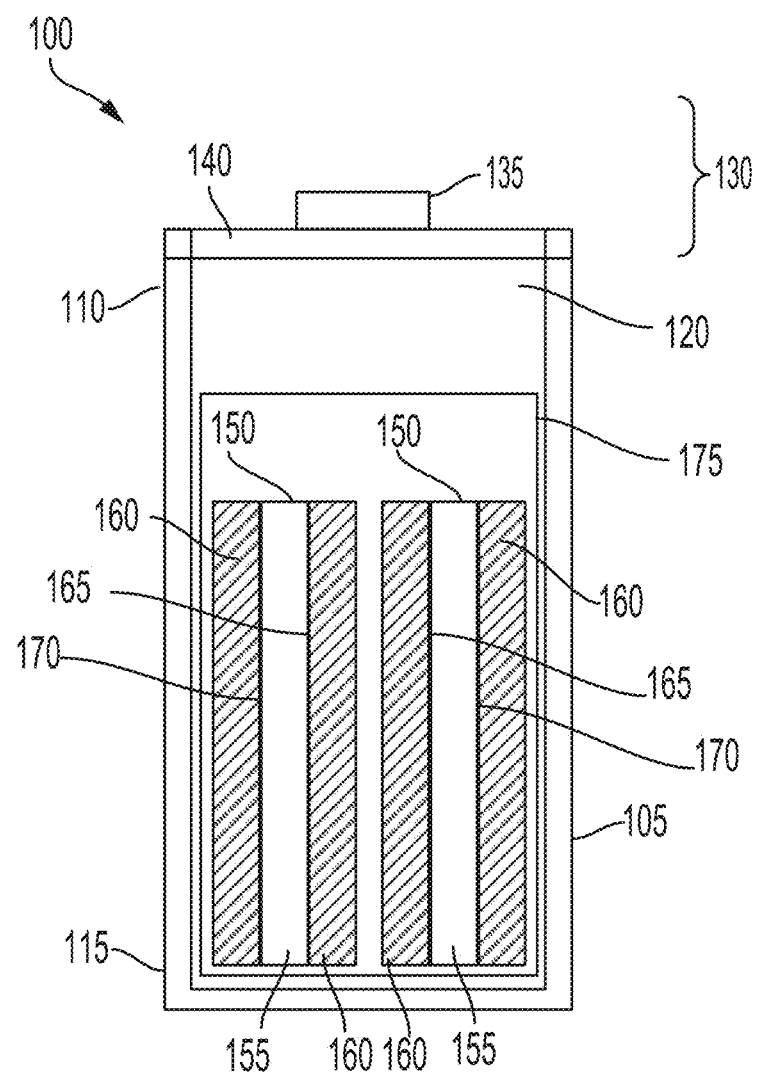
FIG. 1 is a block diagram depicting a cross-sectional view of an example battery cell for a battery pack in an electric vehicle having a plurality of anodes and cathodes, according to an illustrative implementation.

FIG. 1, among others, depicts a cross-sectional view of a battery cell 100 for a battery pack in an electric vehicle. The battery cell 100 can provide energy or store energy for an electric vehicle. For example, the battery cell 100 can be included in a battery pack used to power an electric vehicle. The battery cell 100 can include at least one housing 105. The housing 105 can have a first end 110 and a second end 115. The battery cell 100 can be a lithium-air battery cell, a lithium ion battery cell, a nickel-zinc battery cell, a zinc-bromine battery cell, a zinc-cerium battery cell, a sodium-sulfur battery cell, a molten salt battery cell, a nickel-cadmium battery cell, or a nickel-metal hydride battery cell, among others. The housing 105 can be included or contained in a battery pack (e.g., a battery array or battery module) installed in a chassis of an electric vehicle. The housing 105 can have the shape of a cylindrical casing or cylindrical cell with a circular, ovular, or elliptical base, as depicted in the example of the battery cell of FIG. 1. A height of the housing 105 can be greater than a width of the housing 105. For example, the housing 105 can have a length (or height) in a range from 65 mm to 75 mm and a width (or diameter for circular examples) in a range from 15 mm to 27 mm. In some examples the width or diameter of the housing 105 can be greater than the length (e.g., height) of the housing 105. The housing 105 can be formed from a prismatic casing with a polygonal base, such as a triangle, square, a rectangular, a pentagon, or a hexagon, for example. A height of such a prismatic cell housing 105 can be less than a length or a width of the base of the housing 105. The battery cell 100 can be a cylindrical cell 21 mm in diameter and 70 mm in height. Other shapes and sizes are possible, such as rectangular cells or rectangular cells with rounded edges, cells between 15 mm to 27 mm in diameter or width, and 65 mm to 75 mm in length or height. The housing 105 of the battery cell 100 can include at least one electrically or thermally conductive material, or combinations thereof. The electrically conductive material can also be a thermally conductive material. The electrically conductive material for the housing 105 of the battery cell 100 can include a metallic material, such as aluminum, an aluminum alloy with copper, silicon, tin, magnesium, manganese or zinc (e.g., of the aluminum 4000 or 5000 series), iron, an iron-carbon alloy (e.g., steel), silver, nickel, copper, and a copper alloy, among others. The electrically conductive material and thermally conductive material for the housing 105 of the battery cell 100 can include a conductive polymer. To evacuate heat from inside the battery cell 100, the housing 105 can be thermally coupled to a thermoelectric heat pump (e.g., a cooling plate) via an electrically insulating layer. The housing 105 can include an electrically insulating material. The electrically insulating material can be a thermally conductive material. The electrically insulating and thermally conductive material for the housing 105 of the battery cell 100 can include a ceramic material (e.g., silicon nitride, silicon carbide, titanium carbide, zirconium dioxide, or beryllium oxide, among others) and a thermoplastic material (e.g., polyethylene, polypropylene, polystyrene, or polyvinyl chloride), among others. To evacuate heat from inside the battery cell 100, the housing 105 can be thermally coupled to a thermoelectric heat pump (e.g., a cooling plate). The housing 105 can be directly thermally coupled to the thermoelectric heat pump without an addition of an intermediary electrically insulating layer.

The housing 105 of the battery cell 100 can include the first end 110 (e.g., top portion) and the second end 115 (e.g., bottom portion). The housing 105 can define an inner region 120 between the first end 110 and the second end 115. For example, the inner region 120 can include an interior of the housing 105 or an inner area formed by the housing 105. The first end 110, inner region 120, and the second end 115 can be defined along one axis of the housing 105. For example, the inner region 120 can have a width (or diameter for circular examples) of 2 mm to 6 mm and a length (or height) of 50 mm to 70 mm. The width or length of the inner region 120 can vary within or outside these ranges. The first end 110, inner region 120, and second end 115 can be defined along a vertical (or longitudinal) axis of cylindrical casing forming the housing 105. The first end 110 can be at one end of the housing 105 (e.g., a top portion as depicted in FIG. 1). The second end 115 can be at an opposite end of the housing 105 (e.g., a bottom portion as depicted in FIG. 1). The end of the second end 115 can encapsulate or cover the corresponding end of the housing 105.

The diameter (or width) of the first end 110 can be in a range from 15 mm to 27 mm. The diameter (or width) of the second end 115 can be in a range from 15 mm to 27 mm. The diameter (or width) can correspond to a shortest dimension along an inner surface of the housing 105 within the first end 110 or second end 115. The width can correspond to a width of a rectangular or polygonal lateral area of the first end 110 or second end 115. The diameter (or width) can correspond to a diameter of a circular or elliptical lateral area of the first end 110 or second end 115. The width of the first end 110 (not including the indentation) can be less than the width of the second end 115 of the housing 105. The lateral area of the first end 110 (not including the indentation) can be less than the lateral area of the second end 115 of the housing 105.

At least one lid 130 can be disposed proximate to the first end 110 of the housing 105. The lid 130 can be disposed onto the first lateral end 110 of the housing 105. The lid 130 can include a first portion 135 and a second portion 140. The second portion 140 can couple the lid 130 with the first end 110 of the housing 105. The second portion 140 can be crimped onto, clipped onto, or welded with the first end 110 to couple the lid 130 with the first end 110 of the housing 105. The coupling (e.g., crimped coupling, welded coupling) between the second portion 140 and the first end 110 of the housing 105 can form a hermetic seal, a fluid resistant seal, or a hermetic seal and a fluid resistant seal between the lid 130 and the housing 105, for example, so that the fluid or material within the inner region 120 does not leak from its location within the housing 105.

The first portion 135 can couple with the second portion 140. For example, the first portion 135 can be welded with the second portion 140 to form the lid 130. The first portion 135 can be formed having a shape corresponding to the shape of the second portion 140. The first portion 135 can be formed having a shape corresponding to the shape of the housing 105. For example, the first portion 135 can be formed having a circular, ovular, elliptical, rectangular, or square shape. The first portion 135 can be formed from the same material as the second portion 140. The first portion 135 can be formed from the same material as the housing 105. The first portion 135 can be formed from a different material from the material forming the housing 105. For example, the first portion 135 can include a metallic material, aluminum, an aluminum alloy with copper, silicon, tin, magnesium, manganese or zinc (e.g., of the aluminum 4000 or 5000 series), iron, an iron-carbon alloy (e.g., steel), silver, nickel, copper, and a copper alloy, among others. The first portion 135 can have a height (e.g., length, vertical length) in a range from 3 mm to 20 mm. The height of the first portion 135 can vary within or outside this range. The first portion 135 can have a diameter in a range from 0.5 mm to 18 mm. The diameter of the first portion 135 can vary within or outside this range. The first portion 135 can have a thickness (e.g., distance from an inner surface to an outer surface of the first portion 135) in a range from 0.1 mm to 1 mm (e.g., 0.35 mm). The thickness of the first portion 135 can vary within or outside this range. The lid 130 can be formed such that the first portion 135 has a different height with respect to a first surface (e.g., top surface) of the first end 110 of the housing 105 as compared to a height of the second portion 140. For example, the first portion 135 can have a first height with respect to the first surface of the first end 110 of the housing 105 and the second portion 140 can have a second height with respect to the first surface of the first end 110 of the housing 105. The first height can be greater than the second height. For example, the first portion 135 can be formed having a greater height than the second portion 140. The lid 130 can be formed such that the first portion 135 has a different diameter than the second portion 140. For example, the first portion 135 can have a first diameter and the second portion 140 can have a second diameter. The first diameter can be less than the second diameter. For example, the first portion 135 can be formed within the diameter of the second portion 140 and form a middle region of the second portion 140.

The second portion 140 can be formed having a shape corresponding to the shape of the housing 105. For example, the second portion 140 can be formed having a circular, ovular, elliptical, rectangular, or square shape. The second portion 140 can be formed from the same material as the housing 105. The second portion 140 can be formed from a different material from the material forming the housing 105. The second portion 140 can include, for example, a metallic material, aluminum, an aluminum alloy with copper, silicon, tin, magnesium, manganese or zinc (e.g., of the aluminum 4000 or 5000 series), iron, an iron-carbon alloy (e.g., steel), silver, nickel, copper, and a copper alloy, among others. The second portion 140 can have a diameter in a range from 15 mm to 27 mm. The diameter of the second portion 140 can vary within or outside this range. The second portion 140 can have a height (e.g., vertical width, vertical length) in a range from 0.5 mm to 2 mm (e.g., 1 mm). The height of the second portion 140 can vary within or outside this range. The second portion 140 can have a thickness (e.g., distance from an inner surface to an outer surface of the second portion 140) in a range from 0.1 mm to 1 mm (e.g., 0.35 mm). The thickness of the second portion 140 can vary within or outside this range.

Figure 3:
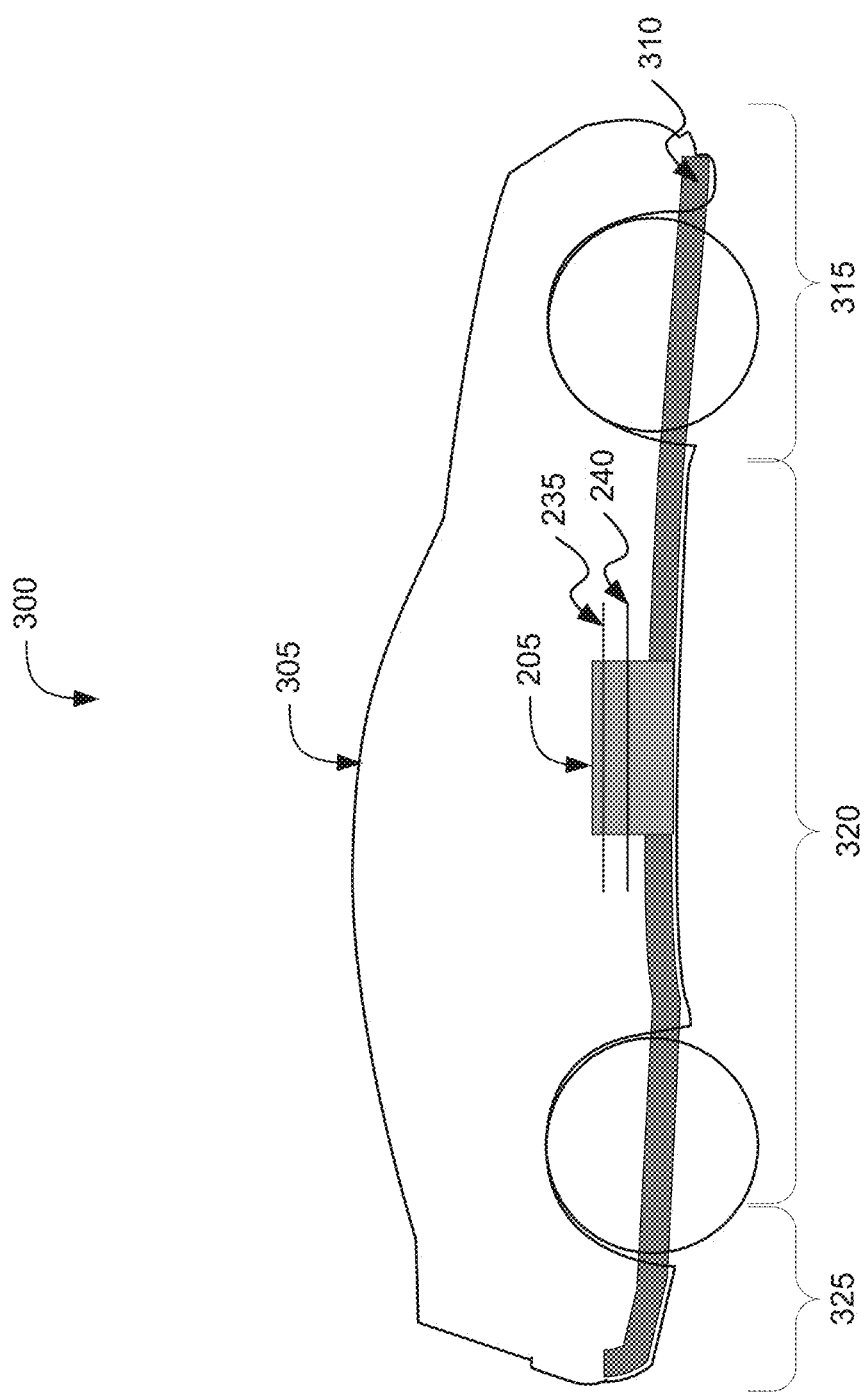
FIG. 3 is a block diagram depicting a cross-sectional view of an example electric vehicle installed with a battery pack.

The lid 130 can include a first polarity layer (e.g., positive polarity), a second polarity layer (e.g., negative polarity), or both a first polarity and a second polarity. For example, the second portion 140 can be a first polarity layer (e.g., positive polarity) or a second polarity layer (e.g., negative polarity). The first portion 135 can be a first polarity layer (e.g., positive polarity) or a second polarity layer (e.g., negative polarity). The second portion 140 can have a different polarity from the first portion 135. The second portion 140 can have the same polarity as the first portion 135. The second portion 140 and the first portion 135 can have the same polarity as the housing 105. The second portion 140 or the first portion 135 can have a different polarity from the housing 105. The housing 105 can be formed from non-conductive material and the second portion 140 can have a first polarity and the first portion 135 can have a second polarity. The second polarity can be different from the first polarity. The second portion 140 or the first portion 135 can operate as a first polarity terminal (e.g., positive terminal) of the battery cell 100. The second portion 140 or the first portion 135 can operate as a second polarity terminal (e.g., negative terminal) of the battery cell 100. For example, the battery cell 100 can couple with a first polarity busbar and a second polarity busbar (e.g., positive and negative busbars, positive and negative current collectors) of a battery pack of an electric vehicle through the second portion 140 or the first portion 135 of the lid 130 (as shown in FIG. 3). Via a module tab connection (or other techniques such as wire bonding of a wire), the second portion 140 or the first portion 135 can couple the battery cell 100 with busbars of the battery pack from the same end or common end (e.g., top or bottom) or from longitudinal sides of the battery cell 100. The battery pack can be disposed in an electric vehicle to power a drive train of the electric vehicle.

For example, the battery cell can include a plurality of electrodes 150. The electrodes 150 can be referred to as cathodes 150 or anodes 150. For example, the electrodes 150 can include cathodes 150. The electrodes 150 can include anodes 150. The electrodes 150 can include cathodes 150 and anodes 150. For example, the plurality of electrodes 150 can include a plurality of cathodes 150 and a plurality of anodes 150. The cathodes 150 can electrically couple with anodes 150 within the inner region 120 of the housing 105. The cathodes 150 and the anodes 150 can be arranged in a stack formation. The anodes 150 can include any substance through which electrical current flows out of an electrolyte disposed within the inner region 120 of the housing 105. The cathodes 150 can include any substance through which electrical current flows into the electrolyte disposed within the inner region 120 of the housing 105. For a lithium-ion battery cell 100, for example, the cathodes 150 can include an aluminum material (e.g., aluminum foil material), a lithium-metal oxide (e.g., lithium cobalt oxide ($LiCoO_2$) and lithium manganese oxide ($LiMn_2O_4$)), a vanadium oxide, (e.g., VO) or an olivine (e.g., $LiFePO_4$), among others. The anodes 150 can include carbonaceous materials (e.g., graphites, carbon fibers, active carbons, and carbon blacks), lithium titanium oxide ($Li_4Ti_5O_{12}$), a metal alloy (e.g., using aluminum, bismuth, antimony, zinc, magnesium, copper, iron, nickel, etc.), or a composite including metal and carbonaceous materials. Electrical current can flow through a tab connected to one or more cathodes 150 to a tab connected to one or more anodes 150 in the respective battery cell 100. The manufacture of the anodes 150 is described in relation to FIGS. 4-7, among others.

The electrodes 150 can include conductive film 155 with a coating 160 disposed on or about a first face 165 and a second face 170 of the electrodes 150. The conductive film 155 can include an aluminum foil, a metallic material, or a shim sheet formed from aluminum material. The conductive film 155 can be formed in a variety of different shapes. For example, the conductive film 155 can have a rectangular shape, square shape, or circular shape. The conductive film 155 can have a length in a range from 1 m to 10 m (e.g., 3 m, 6 m). The length of the conductive film 155 can vary within or outside this range. The conductive film 155 can have a width in a range from 150 mm to 200 mm (e.g., 200 mm). The width of the conductive film 155 can vary within or outside this range. The conductive film 155 can have a thickness in a range from 12 μm to 20 μm (e.g., 12 μm, 20 μm). The thickness of the conductive film 155 can vary within or outside this range.

The first face 165 and the second face 170 can refer to side surfaces or side edges of the respective electrode 150. The first face 165 and the second face 170 can refer to a top surface or a bottom surface of the respective electrodes 150. The coating 160 can be disposed on two surfaces of each of the electrodes 150. For example, the coating 160 can be disposed on opposing or opposite faces or side surfaces of each of the electrodes 150. The coating 160 can be disposed on at least one surface of the electrodes 150. The coating 160 can be disposed on multiple surfaces of the electrodes 150. For example, the coating 160 can be disposed on two different surfaces of the electrode 150 or more than two different surfaces of the electrodes 150. The coating 160 can be disposed on the one or more faces 165, 170 of the conductive film 155 having a thickness in a range from 230 μm to 250 μm.

The first face 165 and the second face 170 can refer to side surfaces or side edges of the respective electrode 150. The first face 165 and the second face 170 can refer to a top surface or a bottom surface of the respective electrodes 150. The coating 160 can be disposed on two surfaces of each of the electrodes 150. For example, the coating 160 can be disposed on opposing or opposite faces or side surfaces of each of the electrodes 150. The coating 160 can be disposed on at least one surface of the electrodes 150. The coating 160 can be disposed on multiple surfaces of the electrodes 150. For example, the coating 160 can be disposed on two different surfaces of the electrode 150 or more than two different surfaces of the electrodes 150. The coating 160 can be disposed on the one or more faces 165, 170 of the conductive film 155 having a thickness in a range from 230 μm to 250 μm.

The electrodes 150 can be disposed or housed within a container 175 within the inner region. For example, the container 175 can house one or more cathodes 150, one or more anodes 150, an electrolyte, or a combination thereof. The one or more cathodes 150 can electrically couple with the one or more anodes 150 to pass electrons from the electrolyte between the cathodes 150 and anodes 150. For example, the electrolyte can include any electrically conductive solution, dissociating into ions (e.g., cations and anions). For a lithium-ion battery cell, for example, the electrolyte can include a liquid electrolyte, such as lithium bis(oxalato)borate ($LiBC_4O_8$ or LiBOB salt), lithium perchlorate ($LiClO_4$), lithium hexaflourophosphate ($LiPF_6$), and lithium trifluoromethanesulfonate ($LiCF_3SO_3$). The electrolyte can include a polymer electrolyte, such as polyethylene oxide (PEO), polyacrylonitrile (PAN), polymethyl methacrylate (PMMA) (also referred to as acrylic glass), or polyvinylidene fluoride (PVdF). The electrolyte can include a solid-state electrolyte, such as lithium sulfide ($Li_2S$), magnesium, sodium, and ceramic materials (e.g., beta-alumna). The electrolyte can include a first polarity electronic charge region or terminus and a second polarity electronic charge region or terminus. For example, the electrolyte can include a positive electronic charge region or terminus and a negative electronic charge region or terminus. A first polarity tab (e.g., positive tab) can couple a first polarity region of the electrolyte with a first polarity layer or first polarity region of the lid 130 to form a first polarity surface area (e.g., positive surface area) on the lid 130 for first polarity wire bonding. For example, the second portion 140 or the first portion 135 can correspond to a first polarity layer or first polarity region of the lid 130. At least one second polarity tab (e.g., negative tab) can couple a second polarity region of the electrolyte (e.g., negative region of electrolyte) with the surface of the housing 105 or a second polarity layer or second polarity region of a lid 130. For example, a second polarity region of the electrolyte can couple with one or more surfaces of the housing 105 or a second polarity layer or second polarity region of the lid 130, such as to form a second polarity surface area (e.g., negative surface area) on the lid 130 for second polarity wire bonding. For example, the second portion 140 or the first portion 135 can correspond to a second polarity layer or second polarity region of the lid 130.

The first portion 135 or the second portion 140 of the lid 130 can couple with one or more electrolytes disposed within the container 175. For example, the first portion 135 or the second portion 140 can couple with at least one electrolyte through one or more tabs. A first polarity tab can couple the electrolyte (e.g., positive region of the electrolyte) with first portion 135 or the second portion 140. The first polarity tab can extend from a first polarity region of the electrolyte to at least one surface of the first portion 135 or the second portion 140. A second polarity tab can couple the electrolyte with the first portion 135 or the second portion 140. The second polarity tab can extend from a second polarity region of the electrolyte to at least one surface (e.g., bottom surface) of the first portion 135 or the second portion 140. The second polarity tab can electrically couple the first portion 135 or the second portion 140 with the second polarity region of the electrolyte. When the first portion 135 or the second portion 140 is coupled with the electrolyte through the second polarity tab, the housing 105 may include non-conductive material. The lid 130 can include at least one insulation material. The at least one insulation material can separate or electrically isolate the first portion 135 and the second portion 140 when the first portion 135 and the second portion 140 have different polarities. The insulation material may include dielectric material. For example, the insulation material can include at least one surface coupled with at least one surface of the first portion 135 and a second surface coupled with the second portion 140 such that the insulation material is disposed between the first portion 135 and the second portion 140.

The battery cells 100 described herein can include both the positive terminal and the negative terminal disposed at a same lateral end (e.g., the top end) of the battery cell 100. For example, the lid 130 can provide a first polarity terminal (e.g., positive terminal) for the battery cell 100 at the first end 110 and a second polarity terminal (e.g., negative terminal) for the battery cell 100 at the first end 110. Having both the positive and the negative terminal on one end of the battery cell 100 can eliminate wire bonding to one side of the battery pack and welding of a tab to another side of the battery cell 100 (e.g., the bottom end or the crimped region). In this manner, a terminal or an electrode tab along the bottom of the battery cell 100 can be eliminated from the structure, thus improving the pack assembly process by making it easier to bond the wire to each of the first polarity terminal (e.g., positive terminal) and the second polarity terminal (e.g., negative terminal) of the battery cell 100. For example, the battery cell 100 can be attached to a first polarity busbar by bonding at least one wire between the at least one surface of the lid 130 and the first polarity busbar. The battery cell 100 can be attached to a second polarity busbar by bonding at least one wire between at least one surface of the lid 130 and the second polarity busbar. Each battery cell 100 can be attached to the second polarity busbar by bonding at least one wire to a side surface of the first end 110 or second end 115 (e.g., bottom surface) of the housing 105 of the battery cell 100.

Figure 2:
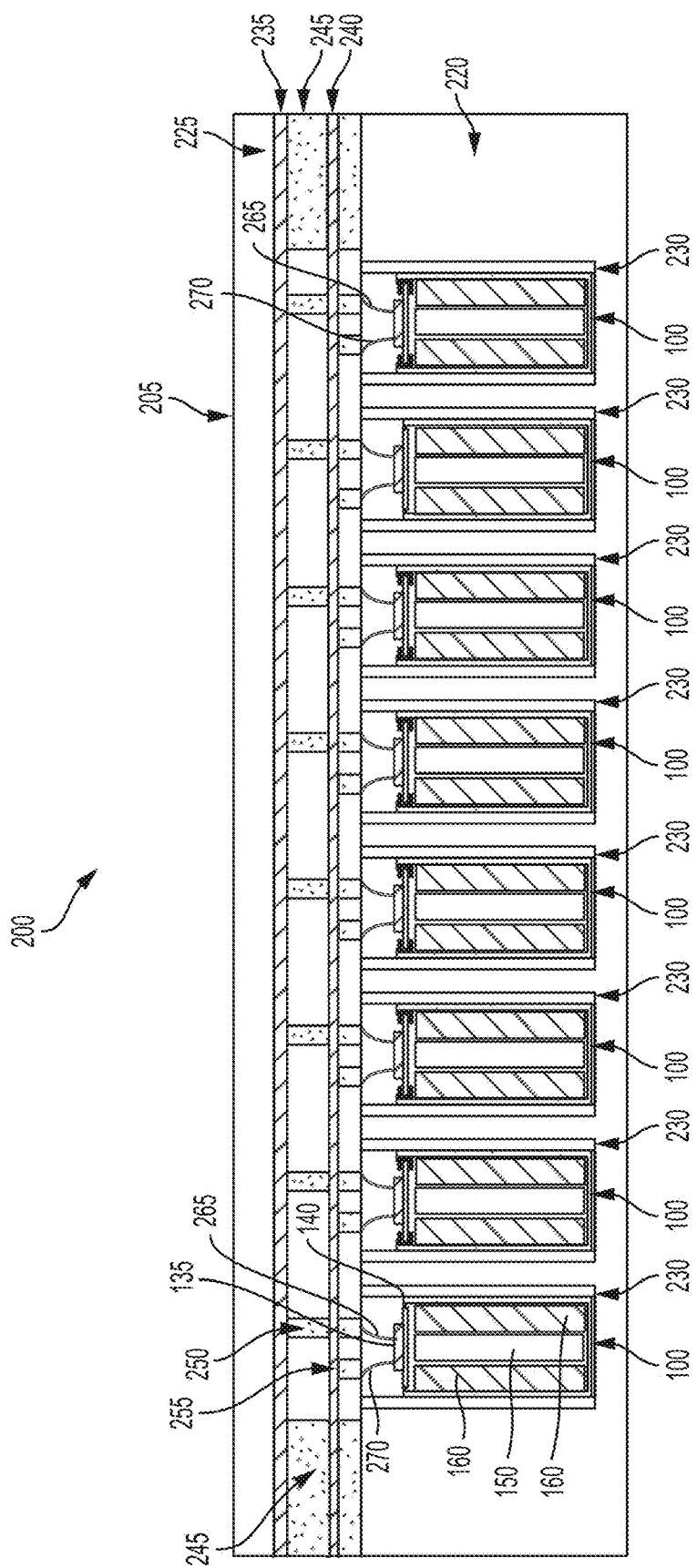
FIG. 2 is a block diagram depicting a cross-sectional view of an example battery pack for holding battery cells in an electric vehicle.

FIG. 2 depicts a cross-section view 200 of a battery pack 205 to hold at least one battery cell 100. For example, the battery pack 205 can include battery cells 100 having at least one anode 150. The anode 150 can include a conductive film 155 having a coating 160 disposed on one or more faces or surfaces of the conductive film 155. The battery cell 100 can be disposed in a battery pack 205 having multiple battery cells 100. The battery pack 205 can include a single battery cell 100 having at least one cathode 150 that includes a conductive film 155 having a coating 160 disposed on one or more faces or surfaces of the conductive film 155. The battery pack 205 can include multiple battery cells 100 having at least one cathode 150 that includes a conductive film 155 having a coating 160 disposed on one or more faces or surfaces of the conductive film 155.

The battery cells 100 can have an operating voltage in a range from 2.5 V to 5 V (e.g., 2.5 V to 4.2 V). The operating voltage of the battery cell 100 can vary within or outside this range. The battery pack 205 can include a battery case 220 and a capping element 225. The battery case 220 can be separated from the capping element 225. The battery case 220 can include or define a plurality of holders 230. Each holder 230 can include a hollowing or a hollow portion defined by the battery case 220. Each holder 230 can house, contain, store, or hold a battery cell 100. The battery case 220 can include at least one electrically or thermally conductive material, or combinations thereof. The battery case 220 can include one or more thermoelectric heat pumps. Each thermoelectric heat pump can be thermally coupled directly or indirectly to a battery cell 100 housed in the holder 230. Each thermoelectric heat pump can regulate temperature or heat radiating from the battery cell 100 housed in the holder 230. The first bonding element 265 and the second bonding element 270 can extend from the battery cell 100 through the respective holder 230 of the battery case 220. For example, the first bonding element 265 or the second bonding element 270 can couple with the second portion 140 of the lid 130, the first portion 135 of the lid 130, or housing 105.

Between the battery case 220 and the capping element 225, the battery pack 205 can include a first busbar 235, a second busbar 240, and an electrically insulating layer 245. The first busbar 235 and the second busbar 240 can each include an electrically conductive material to provide electrical power to other electrical components in the electric vehicle. The first busbar 235 (sometimes referred to herein as a first current collector) can be connected or otherwise electrically coupled to the first bonding element 265 extending from each battery cell 100 housed in the plurality of holders 230 via a bonding element 250. The bonding element 250 can include electrically conductive material, such as a metallic material, aluminum, or an aluminum alloy with copper. The bonding element 250 can extend from the first busbar 235 to the first bonding element 265 extending from each battery cell 100. The bonding element 250 can be bonded, welded, connected, attached, or otherwise electrically coupled to the first bonding element 265 extending from the battery cell 100. The first bonding element 265 can define the first polarity terminal for the battery cell 100. The first bonding element 265 can include a first end coupled with a surface of the lid 130 (e.g., second portion 140, first portion 135) and a second end coupled with a surface of the bonding element 250. The first busbar 235 can define the first polarity terminal for the battery pack 205. The second busbar 240 (sometimes referred to as a second current collector) can be connected or otherwise electrically coupled to the second bonding element 270 extending from each battery cell 100 housed in the plurality of holders 230 via a bonding element 255. The bonding element 255 can include electrically conductive material, such as a metallic material, aluminum, or an aluminum alloy with copper. The bonding element 255 can extend from the second busbar 240 to the second bonding element 270 extending from each battery cell 100. The bonding element 255 can be bonded, welded, connected, attached, or otherwise electrically coupled to the second bonding element 270 extending from the battery cell 100. The second bonding element 270 can define the second polarity terminal for the battery cell 100. The second bonding element 270 can include a first end coupled with a surface of the lid 130 (e.g., second portion 140, first portion 135) and a second end coupled with a surface of the bonding element 255. The second busbar 240 can define the second polarity terminal for the battery pack 205.

The first busbar 235 and the second busbar 240 can be separated from each other by the electrically insulating layer 245. The electrically insulating layer 245 can include any electrically insulating material or dielectric material, such as air, nitrogen, sulfur hexafluoride ($SF_6$), porcelain, glass, or plastic (e.g., polysiloxane), among others, to separate the first busbar 235 from the second busbar 240. The electrically insulating layer 245 can include spacing to pass or fit the first bonding element 265 connected to the first busbar 235 and the second bonding element 270 connected to the second busbar 240. The electrically insulating layer 245 can partially or fully span the volume defined by the battery case 220 and the capping element 225. A top plane of the electrically insulating layer 245 can be in contact or be flush with a bottom plane of the capping element 225. A bottom plane of the electrically insulating layer 245 can be in contact or be flush with a top plane of the battery case 220.

FIG. 3 depicts a cross-section view 300 of an electric vehicle 305 installed with a battery pack 205. For example, a battery module can include one or more than one battery pack 205 within the electric vehicle 305. The battery pack 205 can include at least one battery cell 100 having at least one anode 150 that includes a conductive film 155 having a coating 160 disposed on one or more faces or surfaces of the conductive film 155. The battery cells 100 described herein can be used to form battery packs 205 residing in electric vehicles 300 for an automotive configuration. For example, the battery cell 100 can be disposed in the battery pack 205, and the battery pack 205 can be disposed in the electric vehicle 300. An automotive configuration includes a configuration, arrangement, or network of electrical, electronic, mechanical, or electromechanical devices within a vehicle of any type. An automotive configuration can include battery cells for battery packs in vehicles such as electric vehicles (EVs). EVs can include electric automobiles, cars, motorcycles, scooters, passenger vehicles, passenger or commercial trucks, and other vehicles such as sea or air transport vehicles, planes, helicopters, submarines, boats, or drones. EVs can be fully autonomous, partially autonomous, or unmanned. Thus, the electric vehicle 300 can include an autonomous, semi-autonomous, or non-autonomous human operated vehicle. The electric vehicle 300 can include a hybrid vehicle that operates from on-board electric sources and from gasoline or other power sources. The electric vehicle 300 can include automobiles, cars, trucks, passenger vehicles, industrial vehicles, motorcycles, and other transport vehicles. The electric vehicle 300 can include a chassis 310 (e.g., a frame, internal frame, or support structure). The chassis 310 can support various components of the electric vehicle 300. The chassis 310 can span a front portion 315 (e.g., a hood or bonnet portion), a body portion 320, and a back portion 325 (e.g., a trunk portion) of the electric vehicle 300. The front portion 315 can include the portion of the electric vehicle 300 from the front bumper to the front wheel well of the electric vehicle 300. The body portion 320 can include the portion of the electric vehicle 300 from the front wheel well to the back wheel well of the electric vehicle 300. The back portion 325 can include the portion of the electric vehicle 300 from the back wheel well to the back bumper of the electric vehicle 300.

Figure 4:
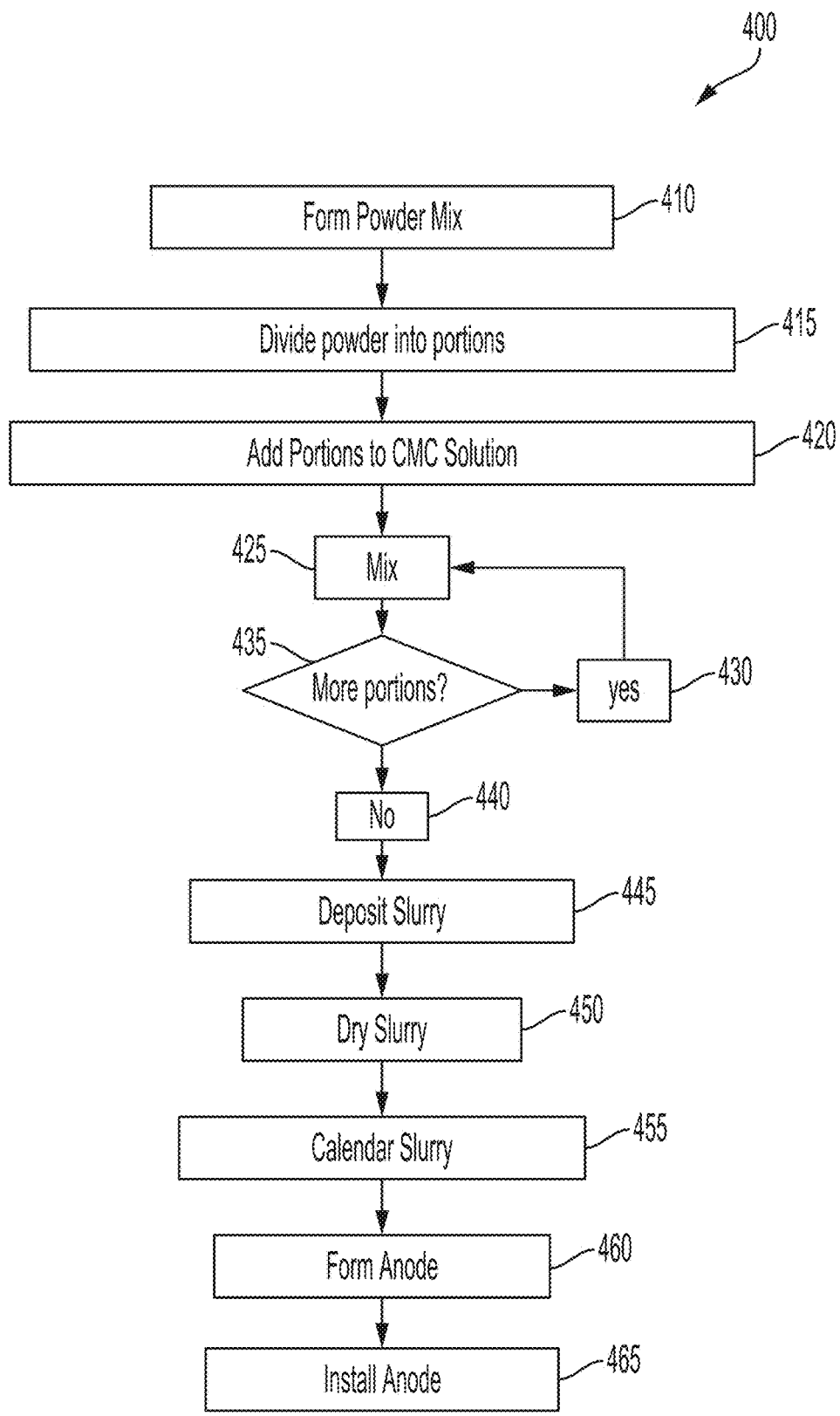
FIG. 4 is a flow diagram depicting an example method of forming an anode for an electric vehicle.

The battery pack 205 including at least one battery cell 100 having at least one anode 150 that includes a conductive film 155 having a coating 160 disposed on one or more faces or surfaces of the conductive film 155 can be installed or placed within the electric vehicle 300. For example, the battery pack 205 can couple with a drive train unit of the electric vehicle 300. The drive train unit may include components of the electric vehicle 300 that generate or provide power to drive the wheels or move the electric vehicle 300. The drive train unit can be a component of an electric vehicle drive system. The electric vehicle drive system can transmit or provide power to different components of the electric vehicle 300. For example, the electric vehicle drive train system can transmit power from the battery pack 205 to an axle or wheels of the electric vehicle 300. The battery pack 205 can be installed on the chassis 310 of the electric vehicle 300 within the front portion 315, the body portion 320 (as depicted in FIG. 4), or the back portion 325. A first busbar 335 (e.g., first polarity busbar) and a second busbar 340 (e.g., second polarity busbar) can be connected or otherwise be electrically coupled with other electrical components of the electric vehicle 300 to provide electrical power from the battery pack 205 to the other electrical components of the electric vehicle 300. For example, the first busbar 335 can couple with at least one surface of a battery cell 100 (e.g., lid 130, housing 105) of the battery pack 205 through a wirebond or bonding element (e.g., bonding element 350 of FIG. 3). The second busbar 340 can couple with at least one surface of a battery cell 100 (e.g., lid 130, housing 105) of the battery pack 205 through a wirebond or bonding element (e.g., bonding element 355 of FIG. 2).

FIG. 4 depicts a flow diagram of an example method 400 to construct an anode for a battery cell. The method 400 can include forming a powder mix (ACT 410). The powder mix can include carbonaceous material and a conductive additive. The method 400 can include forming a powder mix of a conductive additive and an active material that can include the carbonaceous material. The carbonaceous material can be an active material. The active material can include or can be graphite, carbon fibers, active carbons, carbon blacks, a combination thereof, or others. The active material may be between about 90% and about 10% by weight of the powder mixture. The active material may be between about 93% and about 97% by weight of the powder mixture. The conductive additive can be or can include conductive graphite, conductive carbon, carbon black, or a combination thereof. The carbonaceous material may be can be other conductive materials. The conductive additive may be between about 0% and about 10% by weight of the powder mixture. The conductive additive may be between about 0% and 3% by weight of the powder mixture. The powder proportions can be such that the final slurry is about 96.5% active material and about 0.5% conductive material.

The carbonaceous material and the conductive additive can be combined to a total weight of between about 500 g and about 100 kg, between about 1 kg and about 80 kg, between about 2 kg and about 60 kg, between about 4 kg and about 60 kg, or between about 5 kg and about 50 kg.

The method 400 can include dividing the powder mix into a plurality of portions (ACT 415). The method 400 can include dividing the powder mix into between about 2 and about 10 portions. The method 400 can include dividing the powder mix into between about 2 and about 8 portions, between about 2 and about 6 portions, between about 3 and 6 portions, or between about 3 and 5 portions. The powder mix can be divided into 3 portions. The powder mix can be divided into portions based on weight or volume of the powder mix. Each of the portions can be of the same size (e.g., weight or volume). Each of the portions can be of a different size (e.g., weight or volume). For example, a first portion to be added to the CMC solution can be relatively larger than a subsequent portion to be added to the CMC solution. The size of the portions can be inversely related to the amount of powder mix already mixed into the CMC solution. For example, subsequent portions can be smaller in size as the powder mix is added to the CMC solution. Each portion of the powder mix can be between about 200 g and about 1 kg, between about 200 g and about 800 g, or between about 400 g and about 600 g. Each portion of the powder mix can be 500 g.

When the portions are the same size, the powder mix may be divided into portions within 10% by weight of each other. The number of portions the powder mix is divided into can be based on the total weight or volume of the powder mix to be added to the CMC solution. For example, each portion can have a fixed weight (e.g., 200 g). In this example, if the total weight of the powder mix is about 600 g, the powder mix can be divided into 3 portions. If the total weight of the powder mix were about 800 g, the powder mix can be divided into 4 portions.

The powder mix can be mixed in a roll mixer. The powder mix can be mixed for between about 5 hr. and about 15 hr., between about 8 hr. and about 14 hr., or between about 10 hr. and about 13 hr. The powder mix can be mixed for about 12 hr. before the powder mix is used in subsequent steps in the method 400.

The method 400 can include iteratively combining the powder portions with a CMC solution (ACT 420). The CMC solution can be water based, and for example can include CMC and water. The water can be de-ionized (DI) water. The CMC solution can be made by adding DI water to CMC. The CMC solution can be between approximately 1.0% and approximately 1.3% CMC by weight. The CMC and DI water can be mixed under high shear. For example, the CMC and DI water can be mixed at between about 500 revolutions/minute (RPM) and about 2000 RPM, between about 725 RPM and about 1500 RPM, or between about 1000 RPM and about 1250 RPM. The CMC and DI water can be mixed between about 3 min and about 10 min, between about 3 min and about 7 min, or between about 3 min and about 5 min. For example, the CMC solution can be mixed at 1,000 RPM for 5 minutes. Prior to use in the method 400, the CMC solution may be continuously mixed in a roll mixer for between approximately 12 hours and approximately 24 hours prior to combining the solution with the portions of the powder mix. The CMC solution can be made no less than 12 hr. before combination with the powder mix.

The method 400 can include adding a portion of the powder mix with the CMC solution (ACT 420). The powder mix portions can be serially added to the CMC solution. For example, the method 400 can include adding the powder mix portions iteratively to the CMC solution. A portion of the powder mix can be added to the CMC solution as the CMC solution is stirred or agitated.

After a portion of the powder mix is added to the CMC solution, the method 400 can include mixing the added powder mix portion and the CMC solution (ACT 425). The CMC solution and the powder mix portion can be mixed at between about 1500 RPM and about 3000 RPM, between about 2000 RPM and about 2700 RPM, or between about 2000 RPM and about 2500 RPM. The CMC solution and the portion of the powder mix can be mixed at 2000 RPM. The CMC solution and the powder mix portion can be mixed for between about 30 minutes and about 90 minutes. The CMC solution and the powder mix portions can be mixed in a PD mixer. The mixed CMC solution and powder mix may form a slurry and be referred to as an anode slurry. Also referring to FIG. 1, among others, the anode slurry can be the coating 160. For example, when baked or heated the anode slurry can form the coating 160.

The method 400 can include determining if there are additional portions of the powder mix to add (ACT 435). If each of the portions of the powder mix have been added to the CMC solution and the system determines that there are no additional portions of the powder mix to add to the CMC solution (ACT 440), the method 400 can continue to depositing the anode slurry on the conductive film (ACT 445). If the system determines there are additional portions of the powder mix to add to the CMC solution (ACT 430), the method 400 can return to ACT 420 to add the next portion of the powder mix. The method 400 can include iteratively adding and then mixing the portions of the powder mix to the CMC solution until all of the portions of the powder mix are added to the CMC solution.

Once each of the portions of the powder mix are added to the CMC solution, DI water can be added to reduce the viscosity. The DI water can be added to bring the viscosity into the range of approximately 2500 cps to approximately 3000 cps if the anode slurry is too viscous. Additional powder mix can be added to the anode slurry if anode slurry's viscosity is too low.

The method 400 can also include adding a binder to the anode slurry. The binder can be aqueous styrene butadiene rubber (SBR) solution, polyacrylic acid (PAA), or a combination thereof. The SBR may act as a binder. The SBR may be between about 0% and about 10%, between about 1% and about 8%, or between about 1% and about 5% of the anode slurry by weight. The anode slurry can be further mixed once the binder is added to the anode slurry. Once the binder is added to the anode slurry, the anode slurry can be mixed in one or more phases. For example, in a first phase, the slurry may be mixed at between about 800 RPM and about 1200 RPM. The slurry can be mixed in a PD mixer. During the first phase, the anode slurry can be mixed for between about 2 minutes and about 10 minutes, between about 2 minutes and about 7 minutes, or between about 2 minutes and about 5 minutes. In a second phase, the anode slurry can be mixed in a roll mixer. The anode slurry can be mixed at about 30 RPM in the roll mixer for between about 30 minutes and about 90 minutes or between about 45 minutes and about 90 minutes. The anode slurry may be mixed in a roll mixer until there are no remaining agglomerates in the anode slurry. The anode slurry may be mixed at between about 15 RPM and about 45 RPM or between about 30 RPM and about 45 RPM in the roll mixer. The final slurry solid material may be 96.5% active material and 0.5% conductive material. The final slurry solid material may be 96.5% active material and 0.5% conductive material and 3% binder.

During the mixing, the particle size in the anode slurry can be periodically measured. The particle size can be measured using a Hegman gauge. The mixing can continue until repeated measurements of the anode slurry indicate substantially no remaining agglomerates remaining in the anode slurry. For example, the mixing can continue until two sequential measurements are found with substantially no remaining agglomerates. The mixing can continue until a Hegman gauge reading determines the agglomerates are below about 30 µm, below about 40 µm, or below about 50 µm. The slurry can have a solid content between 45% and 55% by weight.

The method 400 can include depositing the anode slurry (ACT 445). The anode slurry can be dispensed on a conductive film. The conductive film can include aluminum, bismuth, antimony, zinc, magnesium, copper, iron, nickel, or a combination thereof. The conductive film can be an alternate conductive material. The deposition of the slurry on the conductive film is illustrated and described further in relation to FIGS. 5-7, among others.

The anode slurry can be dispensed on the conductive film to a thickness (or depth) in a range between about 100 µm and about 250 µm to form a slurry coating. The anode slurry can be deposited to have a single sided material loading between about 12 mg/cm$^2$ and about 18 mg/cm$^2$. The anode slurry can be deposited onto the conductive film by a physical coating processes such as spin coating, dip coating, drop coating, or others for example. The anode slurry can be deposited onto the conductive film by spray coating techniques such as spray deposition and others for example. The anode slurry can be deposited onto the conductive film by roll-to-roll coating processes such as Anilox, immersion dip coating, metering rod coating, forward roll coating, reverse roll coating, slot die coating, extrusion coating, ink jet printing, and others, for example. The coating may be applied to one or more faces or surfaces of the conductive film. Applying the slurry coating can include a slot-die coating process.

The method 400 can include drying the anode slurry (ACT 450). The slurry can be dried after being dispensed on the face of the conductive film. The slurry can be dried using one or more ovens. The drying of the anode slurry is further described in relation to FIGS. 6 and 7, among others.

The method 400 can include calendaring the anode slurry (ACT 455). The anode slurry can be calendered to set the thickness of the anode slurry to a substantially constant or uniform thickness along the length of the conductive film. The calendering of the anode slurry may increase the anode slurry's density.

Figure 5:
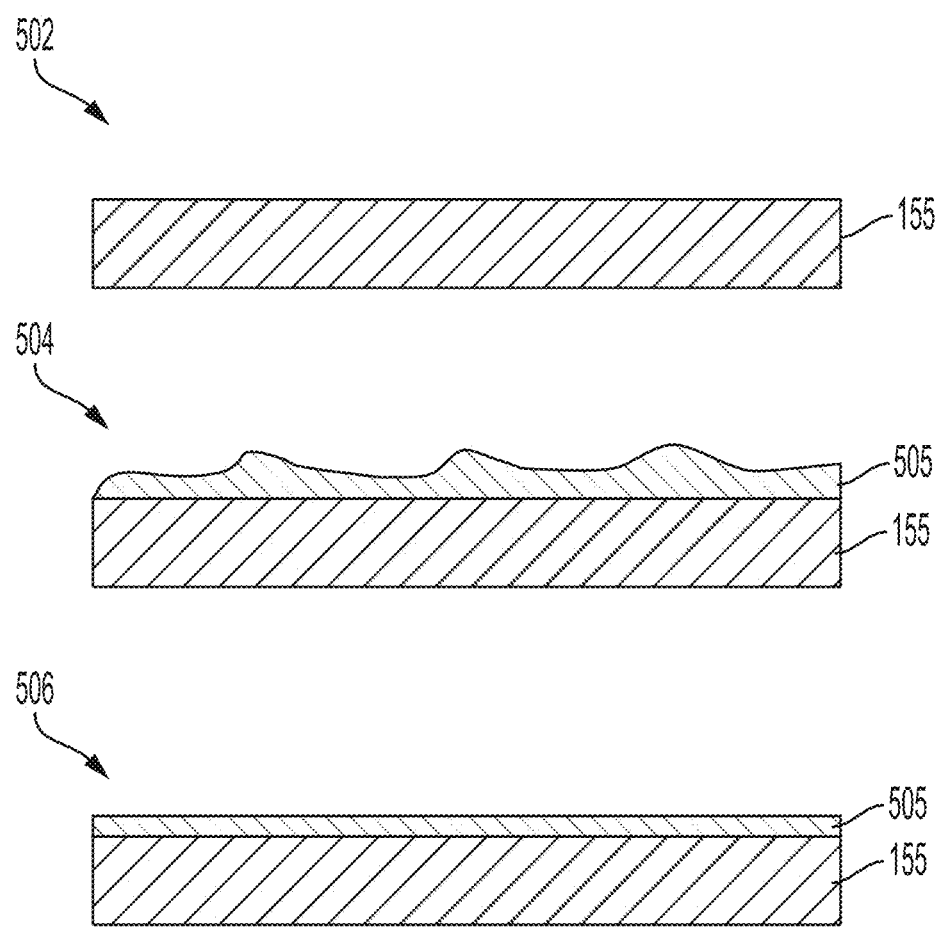
FIG. 5 illustrates cross-sectional views of a calendering process for calendering an anode.

For example, and also referring to FIG. 5, which illustrates cross-sectional views of the calendering process. the stack 502 illustrates a cross-sectional view of the conductive film 155 prior to the deposition of the anode slurry onto the conductive film. The stack 504 illustrates a cross-sectional view of the conductive film 155 after the deposition of the anode slurry 505. As illustrated by the stack 504, the anode slurry 505 can be non-uniform when deposited onto the conductive film 155. For example, the anode slurry 505 can include peaks and depressions. The anode slurry 505 can be dispensed on the conductive film 155 to a thickness in a range between about 100 µm and about 250 µm. The anode slurry 505 can have a material loading in a range from 12 mg/cm$^2$ and 18 mg/cm$^2$. The anode slurry 505 may be applied to one or more faces or surfaces of the conductive film 155.

The stack 506 illustrates the conductive film 155 and the anode slurry 505 after the anode slurry 505 is calendered. As illustrated by the stack 506, the anode slurry 505 can have a substantially uniform thickness along the length of the conductive film 155. Calendering of the slurry coating may increase its density forming a dense slurry coating 510.

The mechanical flexibility of the formed anodes (e.g., the conductive film coated with the baked anode slurry) can be checked by winding the formed anodes. For example, the mechanical flexibility of the anodes 150 can be checked by winding the formed anodes on a 3 mm diameter mandrel. The winding direction can be the same as the direction the coating 160 was applied and the calendering was performed. The anodes 150 calendered to a size in the 3.54 g/cm3 to 3.57 g/cm3 survived a mechanical flexibility test using a mandrel. The anode 150 can be calendered to a range from 3.63 g/cm3 to 3.69 g/cm3. The anodes 150 generated and calendered to a size in the 3.63 g/cm3 to 3.69 g/cm3 survived a mechanical flexibility test using a mandrel.

The method 400 can include forming an anode (ACT 460). The anode can be formed from by cutting the conductive film (with the baked anode slurry) into segments of predetermined lengths. The conductive film (with the baked anode slurry) can be cut to a length between about 20 cm and about 250 cm, between about 50 cm and about 200 cm, or between about 100 cm and about 200 cm. The baked anode slurry, as a coating on one or more faces of the conductive film, can have an area loading of between 12 mg/cm$^2$ and 18 mg/cm$^2$ and can include between 95% and 99% by weight the carbonaceous material and the conductive additive.

The method 400 can include installing the anode (ACT 465). The anode can be installed in a battery cell. For example, the method can include disposing a plurality of anodes into the inner region of a housing. The anodes can be disposed within a container within the container's inner region. One or more anodes can be disposed within the inner region of the housing with one or more cathodes. For example, cathodes and anodes can be iteratively stacked and within the inner region of the housing. In another example, a cathode and an anode can be coupled together and then rolled to form "jelly roll" configuration. The anodes and the cathodes can be separated by an insulating sheet. The cathodes can electrically couple with the anodes to form the battery cell. For example, the cathode can form a cathode portion of the battery cell and electrically couple with the anodes that form an anode portion of the battery cell. The cathode portion and the anode portion can be disposed within the container and the container can include an electrolyte. The electrolyte can include any electrically conductive solution, dissociating into ions (e.g., cations and anions). During operation of the battery, the electrons from the electrolyte can pass between the anode portion and the cathode portion.

Figure 6:
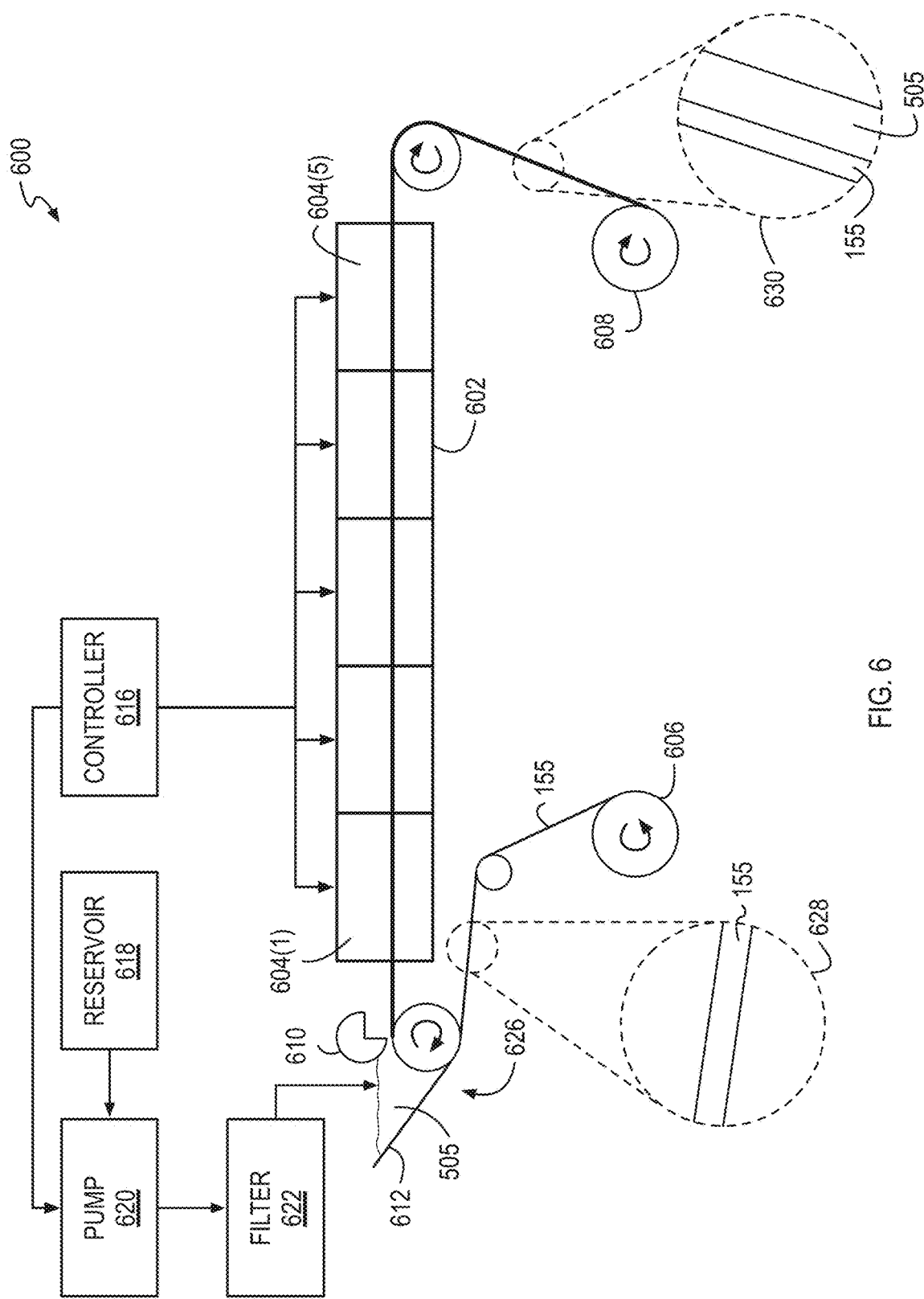
FIG. 6 illustrates a system to form an anode for an electric vehicle battery that can include an anode.

FIG. 6 illustrates a system 600 to form an anode for an electric vehicle batter. The system 600 can include a foil 155 that is unspooled at a holder 606 and received at a take up spool 608. The foil 155 can also be referred to as a conductive film 155. The foil 155 can pass from the holder 606 to the take up spool 608 via an oven 602 that includes a plurality of zones 604(1)-604(5), which can generally be referred to as zones 604. The system 600 can include a coating unit 626 that can include a hopper 612 and a comma bar 610. An anode slurry 505 can be deposited on the foil 155 at a hopper 612. A comma bar 610 can control the thickness of the deposited anode slurry 505. A controller 616 can control the components of the system 600. The system 600 can include a reservoir 618 that can store additional anode slurry 505. A pump 620 can pump the anode slurry 505 from the reservoir 618 to the hopper 612. In flowing to the hopper 612, the anode slurry 505 can pass through a filter 622.

The system 600 can include one or more holders 606. The holder 606 can hold a roll of the foil 155. The holder 606 can include a mandrill that can receive a roll of the foil 155. The holder 606 can include one or more air chucks to hold the roll of the foil 155 in place. The roll of foil 155 can be placed on the holder 606 and can be aligned in the center of the holder 606. The holder 606 can be configured such that the foil 155 unwinds in a counter clockwise direction from the holder 606.

After installation on the holder 606, the foil 155 can be threaded through the coating unit 626 and then through the oven 602. The end of the foil 155 can be coupled with the take up spool 608. The end of the foil 155 can be cut perpendicular to the long edge of the foil 155 to provide a straight cut across the foil 155. The cut end of the foil 155 can be coupled with the take up spool 608 by, for example, taping the foil 155 to the take up spool 608. The system 600 can include additional roller units between the holder 606 and the take up spool 608, such as wind and rewind units. The rewind roll can be configured to rotate marginally faster than an inner unit.

The system 600 can include one or more coating units 626. The coating unit 626 can deposit the anode slurry 505 onto a face of the foil 155. The coating units 626 can include the hopper 612 and the comma bar 610. The comma bar 610 can be set to a zero position above the foil 155 as measured by one or more calipers of the comma bar 610. The comma bar 610 can then be set to a predetermined height above the foil 155. The set height of the comma bar 610 above the foil 155 can control the thickness of the anode slurry 505 that is deposited onto the foil 155. For example, the comma bar 610 can be set 200 µm above the foil 155 such that 200 µm of the anode slurry 505 are deposited on the foil 155.

The coating unit 626 can include a hopper 612 for the storage of anode slurry 505. The hopper 612 can have a volume of between about 1 gallon and about 4 gallons. The hopper 612 can be placed against the one or more rollers of the coating unit 626 to create a seal between the foil 155 and the edge of the hopper 612. The hopper 612 can be cleaned with acetone or isopropyl alcohol between uses.

As illustrated in the zoomed views 628 and 630, the coating unit 626 can deposit the anode slurry 505 onto a face of the foil 155. As illustrated by the first zoomed view 628, prior to the coating unit 626, the foil 155 can enter the coating unit 626 without a coating of the anode slurry 505 on either face of the foil 155. As illustrated by the second zoomed view 630, after the coating unit 626, a layer of the anode slurry 505 is deposited onto one face of the foil 155. The coating unit 626 can deposit the anode slurry 505 onto both faces of the foil 155. The coating unit 626 can deposit the anode slurry 505 on both faces of the foil 155 at the same time. The coating unit 626 can deposit the anode slurry 505 on the faces of the foil 155 sequentially. For example, the anode slurry 505 can be deposited onto a first face of the foil 155 during a first pass of the foil 155 through the coating unit 626. The anode slurry 505 can be deposited on the second face of the foil 155 during a second or subsequent pass through the coating unit 626.

The system 600 can include one or more ovens 602. The oven 602 can include a plurality of zones 604. Each of the zones 604 can be an individual oven which are serially aligned such that the foil 155 passed serially through each of the zones 604. The oven 602 can be a single oven with a plurality of zones 604 that are individually controllable. For example, the over 602 can include a plurality of heating elements. Each of the heating elements can be in a different one of the zones 604 and can control the temperature within that zone 604 of the oven 602. The controller 616 can control the temperate of each of the zones 604. Each zone 604 can include a plurality of heating coils that can be heated to a predetermined temperature. Each of the zones 604 can be individually set to a temperature between about 40° C. and about 125° C., between about 50° C. and about 110° C., between about 50° C. and about 90° C., or between about 60° C. and about 80° C.

The system 600 can include a reservoir 618. The reservoir 618 can include additional anode slurry 505 that can be supplied to the hopper 612 as the anode slurry 505 in the hopper 612 is deposited on the foil 155. The anode slurry 505 can be held in the reservoir 618 under continuous or intermittent vacuum. The vacuum can remove air bubbles from the anode slurry 505. The reservoir 618 can include a stirring system to prevent the anode slurry 505 from settling or forming agglomerations in the reservoir 618. The pump 620 can flow the anode slurry 505 from the reservoir 618 to the hopper 612. The pump 620 can pump the anode slurry 505 at a rate between about 100 ml/min and about 500 ml/min, between about 100 ml/min and about 400 ml/min, or between about 200 ml/min and about 300 ml/min. The hopper 612 can include a fluid level sensor that can activate the pump 620 when the level of the anode slurry 505 in the hopper 612 falls below a predetermined threshold. The pump 620 can pump the anode slurry 505 through a filter 622 prior to depositing the anode slurry 505 in the hopper 612. The filter 622 can be a 150-mesh filter.

The system 600 can include one or more controllers 616. The controller 616 can control the temperature in each of the zones 604 of the oven 602. For example, the controller 616 can be coupled with a plurality of temperature sensors disposed in the zones 604, and the controller 616 can adjust the over's heating coils based on the readings of the temperature sensors. The controller 616 can control the speed of the system's rollers to control the speed at which the foil 155 moves through the oven 602. The controller 616 can set the rate of the foil 155 through the oven 602 to be between about 10 in/min and about 50 in/min, between about 15 in/min and about 40 in/min, between about 20 in/min and about 30 in/min, or between about 20 in/min and 25 in/min. The rate of the foil 155 through the oven 602 can be 20 in/min. The controller 616 can also control the activity of the pump 620. The controller 616 can control the rate of flow generated by the pump 620 and when the pump 620 is active. The controller 616 can include, but is not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits.

Figure 7:
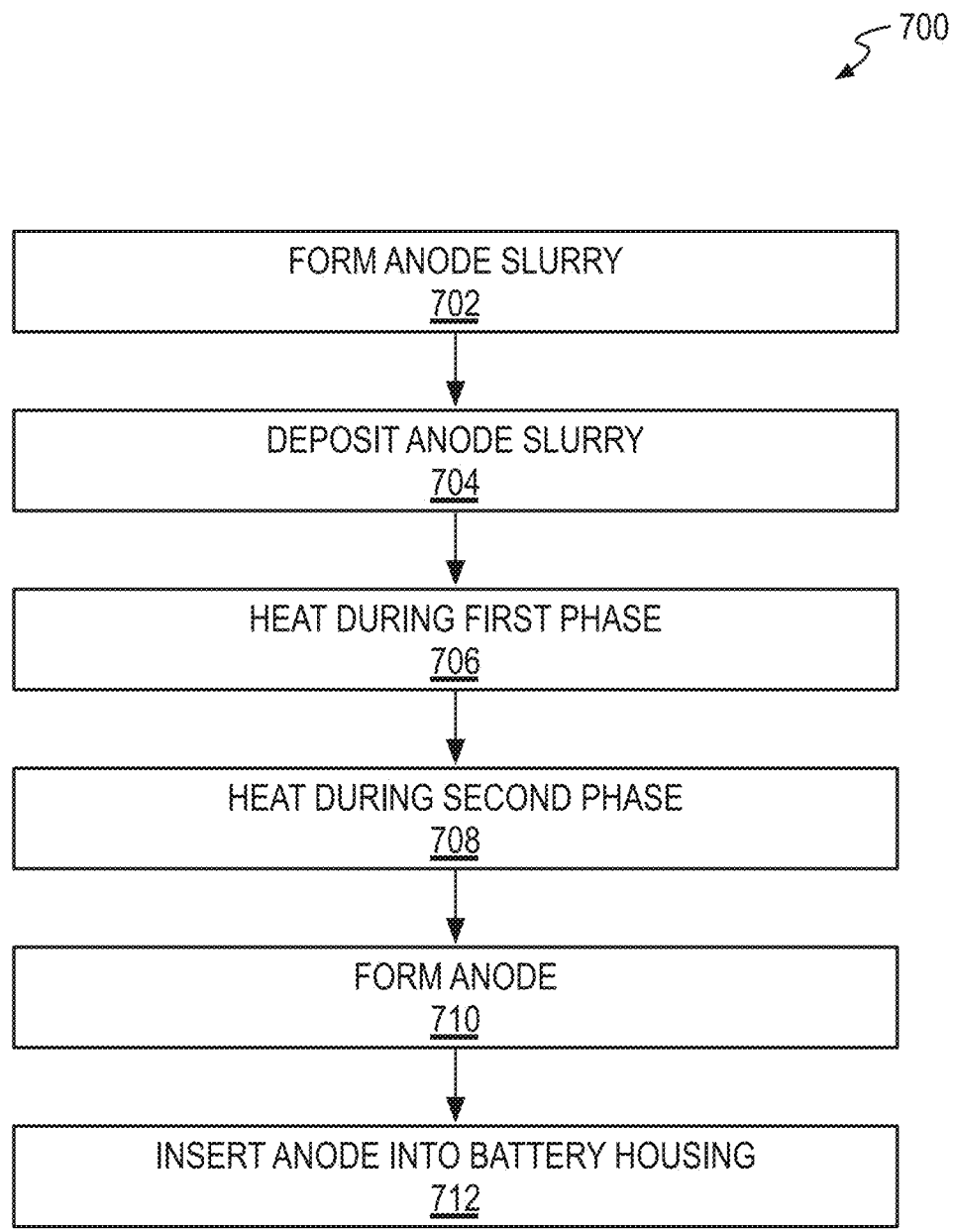
FIG. 7 illustrates a block diagram of an example method to provide power to an electric vehicle.

FIG. 7 illustrates a block diagram of an example method 700 to provide power to an electric vehicle. The method 700 can include forming an anode slurry (ACT 702). The method 700 can include depositing the anode slurry (ACT 704). The method 700 can include heating the anode slurry in a first phase (ACT 706) and a second phase (ACT 710). The method 700 can include forming an anode (ACT 712) and inserting the anode into a battery housing (ACT 714).

The method 700 can include forming an anode slurry (ACT 702). The method 700 can include forming the anode slurry as described above in relation to FIG. 4, among others. Also referring to FIG. 6, among others, once formed the anode slurry can be stored in a reservoir 618. The anode slurry can be vacuumed in the reservoir 618 or another pressure vessel to remove air bubbles within the anode slurry. A pump 620 can pump the anode slurry from the reservoir 618 to the hopper of the coating unit 626. The pump 620 can pump the anode slurry through a filter 622 to remove agglomerations within the anode slurry.

The method 700 can include depositing the anode slurry (ACT 704). The anode slurry can be deposited onto a first face of a foil. The foil can include cooper. The foil can include primarily copper. The foil can be between about 200 mm and about 500 mm, between about 200 mm and about 400 mm, or between about 250 mm and about 300 mm wide. The foil can be between about 5 µm and about 15 µm, between about 5 µm and about 12 µm, between about 5 µm and about 10 µm, or between about 8 µm and about 10 µm thick. The anode slurry can be deposited onto the face of the foil to a thickness of between about 50 µm and about 400 µm, between about 100 µm and about 350 µm, between about 100 µm and about 300 µm, or between about 100 µm and about 200 µm. The anode slurry can be deposited onto the film at a rate between about 100 mL/min and about 300 mL/min, between about 150 mL/min and about 300 mL/min, or between about 150 mL/min and about 250 mL/min.

As described above, and referring to FIG. 6, among others, the foil can unwind from a holder 606 and pass through a coating unit 626. The foil can be collected at a take up spool 608. A leader can be formed on the foil by allowing a predetermined length of the foil to pass through the system and collect on the take up spool 608 prior to the start of depositing the anode slurry on the foil. The uncoated leader section of the foil can be used when setting up the foil for a second pass through the system to coat the second face of the foil. For example, the spooled foil can be removed from the take up spool 608 and placed on the holder 606. The foil can be passed through the coating unit 626 again to coat the second face of the foil. The leader can be coupled with the take up spool 608.

The method 700 can include heating the anode slurry in a first phase (ACT 706). During the first phase the anode slurry and the foil can be passed through a plurality of ovens or a plurality of zones of an oven. The temperature of each of the zones can be independently controlled. During the first phase, the anode slurry coated foil can pass through three zones. Each of the zones can be set to a temperature between about 50° C. and 70° C., between about 55° C. and about 65° C., or between about 57° C. and about 62° C. The temperature of each of the three zones can be set to 60° C.

Each of the zones can be between about 50 cm and about 100 cm, between about 60 cm and about 100 cm, between about 70 cm and about 90 cm, or between about 80 cm and about 90 cm long. The zones can be 80 cm long. The anode slurry coated foil can pass through the zones at a rate of between about 10 in/min and about 35 in/min, between about 15 in/min and about 30 in/min, or between about 15 in/min and about 25 in/min. The anode slurry coated foil can pass through the zones at a rate of about 20 in/min. The length of time the anode slurry covered foil spends in each zone can be based on the length of the zone and the rate at which the foil passes through the zone. A given portion of the foil can spend between about 1 minute and about 5 minutes, between about 1 minute and 3 minutes, or between about 1 minute and about 2 minutes in each of the zones. The given portion of the foil can spend about 1.5 minutes in each of the zones.

The method 700 can include heating the anode slurry in a second phase (ACT 708).

During the second phase the anode slurry and the foil can be passed through a plurality of ovens or a plurality of zones of an oven. The temperature of each of the zones can be independently controlled. During the second phase, the anode slurry coated foil can pass through two zones. Each of the zones can be set to a temperature between about 70° C. and about 90° C., between about 72° C. and about 87° C., or between about 75° C. and about 85° C. The zones of the second phase can be set to 80° C.

Each of the zones can be between about 50 cm and about 100 cm, between about 60 cm and about 100 cm, between about 70 cm and about 90 cm, or between about 80 cm and about 90 cm long. The zones can be 80 cm long. The anode slurry coated foil can pass through the zones at a rate of between about 10 in/min and about 35 in/min, between about 15 in/min and about 30 in/min, or between about 15 in/min and about 25 in/min. The anode slurry coated foil can pass through the zones at a rate of about 20 in/min. The length of time the anode slurry covered foil spends in each zone can be based on the length of the zone and the rate at which the foil passes through the zone. A given portion of the foil can spend between about 1 minute and about 5 minutes, between about 1 minute and 3 minutes, or between about 1 minute and about 2 minutes in each of the zones. The given portion of the foil can spend about 1.5 minutes in each of the zones.

The steps described above in relation to ACT 702-708 can be repeated for the second face of the foil. For example, once the anode slurry is deposited on a first face of the foil and the anode slurry is baked during the first and the second phase, the foil can be passed through the slurry deposition system a second time to coat the opposite side of the foil with the anode slurry. The anode slurry deposited on the second face of the foil can be baked in a method similar to how the anode slurry deposited on the first face was baked.

For example, for a first phase for the second side of the foil (and a third phase in total) the anode slurry and the foil can be passed through a plurality of ovens or a plurality of zones of an oven. The temperature of each of the zones can be independently controlled. During the first phase, the anode slurry coated foil can pass through three zones. Each of the zones can be set to a temperature between about 50° C. and 70° C., between about 55° C. and about 65° C., or between about 57° C. and about 62° C. The temperature of each of the three zones can be set to 60° C.

During a second phase for the second side of the foil (and a fourth phase in total) the anode slurry and the foil can be passed through a plurality of ovens or a plurality of zones of an oven. The temperature of each of the zones can be independently controlled. During the second phase, the anode slurry coated foil can pass through two zones. Each of the zones can be set to a temperature between about 70° C. and about 90° C., between about 72° C. and about 87° C., or between about 75° C. and about 85° C. The zones of the second phase can be set to 80° C.

The method 700 can include forming an anode (ACT 710). The method 700 can include forming an anode that includes at least a portion of the anode slurry on the face of the foil. The foil can be calendared to level the slurry deposited on the one or more faces of the foil. The foil and anode slurry can be calendered as described above in relation to FIG. 5. The foil can be cut to size to form an anode.

The method 700 can include inserting the anode into a battery housing (ACT 712). The anode can be installed in a battery cell, which can be inserted into a battery housing. For example, the method can include disposing a plurality of anodes into the inner region of a housing. The anodes can be disposed within a container within the container's inner region. One or more anodes can be disposed within the inner region of the housing with one or more cathodes. For example, cathodes and anodes can be iteratively stacked and within the inner region of the housing. In another example, a cathode and an anode can be coupled together and then rolled to form "jelly roll" configuration. The anodes and the cathodes can be separated by an insulating sheet. The cathodes can electrically couple with the anodes to form the battery cell. For example, the cathode can form a cathode portion of the battery cell and electrically couple with the anodes that form an anode portion of the battery cell. The cathode portion and the anode portion can be disposed within the container and the container can include an electrolyte. The electrolyte can include any electrically conductive solution, dissociating into ions (e.g., cations and anions). During operation of the battery, the electrons from the electrolyte can pass between the anode portion and the cathode portion.

Figure 8:
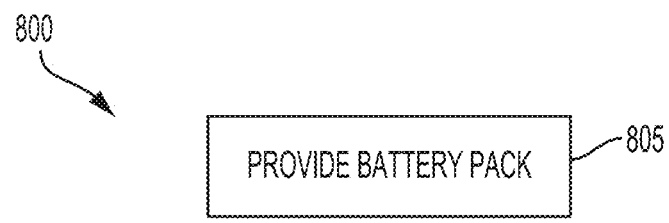
FIG. 8 is a flow diagram depicting an example method of providing battery cells for battery packs for electric vehicles.

FIG. 8 depicts a method 800. The method 800 can include providing a battery pack having at least one battery cell to power an electric vehicle (ACT 805). battery cell can include at least one anode and at least one cathode. The anode can be one of the anodes described herein. The battery cell can include a housing having a first end and a second end. The housing can define an inner region. The battery cell can include a plurality of anodes that can extend into the inner region. The battery cell can be a lithium ion battery cell, a nickel-cadmium battery cell, or a nickel-metal hydride battery cell. The battery cell can be part of a battery pack installed within a chassis of an electric vehicle. For example, the battery cell can be one of multiple battery cells disposed within a battery pack of the electric vehicle to power the electric vehicle. The housing can be formed from a cylindrical casing with a circular, ovular, elliptical, rectangular, or square base or from a prismatic casing with a polygonal base.

Described herein is a battery cell for a battery pack to power an electric vehicle. The battery cell can have a housing. The battery cell can have at least one anode coupled with the housing. The anode can have a conductive film. The conductive film can be one of aluminum, bismuth, antimony, zinc, magnesium, copper, iron, or nickel. The conductive film can have at first face and a second face. The conductive film can have a coating disposed on the first face and the second face. The coating can have carbonaceous material. The carbonaceous material can be at least one of graphite, carbon fibers, active carbons, or carbon black. The coating can have conductive additive. The conductive additive can be at least one of conductive graphite or conductive carbon. The coating can have a density of carbonaceous material and conductive additive between 1.6 g/cm$^3$ and 2.0 g/cm$^3$. The coating can have an area loading of between 12 mg/cm$^2$ and 18 mg/cm$^2$ and between 95% and 99% by weight of the carbonaceous material and the conductive additive.

While acts or operations may be depicted in the drawings or described in a particular order, such operations are not required to be performed in the particular order shown or described, or in sequential order, and all depicted or described operations are not required to be performed. Actions described herein can be performed in different orders.

Having now described some illustrative implementations, it is apparent that the foregoing is illustrative and not limiting, having been presented by way of example. Features that are described herein in the context of separate implementations can also be implemented in combination in a single embodiment or implementation. Features that are described in the context of a single implementation can also be implemented in multiple implementations separately or in various sub-combinations. References to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any act or element may include implementations where the act or element is based at least in part on any act or element.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. A reference to "at least one of 'A' and B'" can include only 'A', only 'B', as well as both 'A' and 'B'. Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, and orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions, and arrangement of the disclosed elements and operations without departing from the scope of the present disclosure.

The systems and methods described herein may be embodied in other specific forms without departing from the characteristics thereof. For example, the voltage across terminals of battery cells can be greater than 5 V. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

Systems and methods described herein may be embodied in other specific forms without departing from the characteristics thereof. The battery cell having the anode coated or formed from the slurry described herein can include battery cells for systems, machines or apparatuses other than electric (including hybrid) vehicles. Descriptions of positive and negative electrical characteristics or polarities may be reversed. For example, elements described as negative elements can instead be configured as positive elements, and elements described as positive elements can instead by configured as negative elements. Further relative parallel, perpendicular, vertical, or other positioning or orientation descriptions include variations within +/−10% or +/−10 degrees of pure vertical, parallel, or perpendicular positioning. References to "approximately," "about," "substantially," or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A method of providing an anode of a battery cell to power an electric vehicle, comprising:
    forming a powder mix comprising a carbonaceous material and a conductive additive;
    dividing the powder mix into a plurality of portions each within 10% by weight of each other;
    generating a slurry by:
        iteratively, for each of the plurality of portions, adding one of the plurality of portions to a carboxymethyl cellulose (CMC) solution and mixing the CMC solution containing the one of the plurality of portions;
        measuring a viscosity of the slurry subsequent to the mixing of the CMC solution containing the one of the plurality of portions;
        adding DI water when the viscosity of the slurry is above 3000 cps;
        adding additional powder mix when the viscosity of the slurry is below 2500 cps;
        adding, subsequent to measuring the viscosity of the slurry, a binder including at least one of a styrene butadiene rubber solution and a polyacrylic acid solution to the slurry;
        mixing the slurry containing the binder until two measurements of a slurry particle size indicate the slurry particle size is below 50 µm;
    dispensing the slurry onto a face of a conductive film to a thickness in a range between 100 µm and 250 µm;
    forming the anode from the conductive film; and
    installing the anode into the battery cell of a battery pack to power the electric vehicle.

2. The method of claim 1, wherein the conductive film comprises at least one of aluminum, bismuth, antimony, zinc, magnesium, copper, iron, and nickel.

3. The method of claim 1, wherein the carbonaceous material comprises at least one of graphite, carbon fibers, active carbons, and carbon blacks.

4. The method of claim 1, wherein the conductive additive comprises at least one of conductive graphite and conductive carbon.

5. The method of claim 1, wherein the added CMC solution is between 1.0% and 1.3% CMC by weight.

6. The method of claim 1, comprising:
    mixing the CMC solution prior to adding the one of the plurality of portions in a roll mixer for between 12 hours and 24 hours.

7. The method of claim 1, comprising:
    mixing the powder mix in a roll mixer for between 5 hours and 15 hours.

8. The method of claim 1, comprising:
    mixing the CMC solution containing the one of the plurality of portions at between 2000 revolutions/minute (RPM) and 2500 revolutions/minute for between 30 minutes and 90 minutes.

9. The method of claim 1, comprising:
    mixing the slurry in a roll mixer for between 30 minutes and 90 minutes at between 15 RPM and 45 RPM.

10. The method of claim 1, comprising:
    adding aqueous styrene butadiene rubber (SBR) solution to the slurry.

11. The method of claim 1, comprising:
    mixing the slurry at between 800 RPM and about 1200 RPM for between 2 minutes and 7 minutes; and
    mixing the slurry in a roll mixer for between 45 minutes and 75 minutes at 30 RPM.

12. The method of claim 1, wherein the slurry has a solid content between 45% and 55% by weight.

13. The method of claim 1, comprising:
    drying the slurry dispensed on the face of the conductive film.

14. The method of claim 1, comprising:
    calendaring the slurry dispensed on the face of the conductive film.

15. The method of claim 1, wherein the CMC solution consists of CMC and water.

16. The method of claim 1, comprising:
    adding an aqueous styrene butadiene rubber (SBR) solution, wherein a resulting slurry has an SBR content between 1% and 5% by weight.

17. The method of claim 16, wherein a final slurry solid material is 96.5% carbonaceous material, 0.5% conductive additive, and 3% SBR.

18. The method of claim 1, comprising:
    adding an aqueous polyacrylic acid (PAA) solution, wherein a resulting slurry has a PAA content between 1% and 5% by weight.

19. The method of claim 18, wherein a final slurry solid material is 96.5% carbonaceous material, 0.5% conductive additive, and 3% PAA.

* * * * *